United States Patent
Adachi

(10) Patent No.: US 10,971,978 B2
(45) Date of Patent: Apr. 6, 2021

(54) ADAPTER FOR MOTOR REPLACEMENT AND MOTOR REPLACEMENT METHOD

(71) Applicant: FANUC CORPORATION, Yamanashi (JP)

(72) Inventor: Satoshi Adachi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/165,052

(22) Filed: Oct. 19, 2018

(65) Prior Publication Data

US 2019/0140528 A1 May 9, 2019

(30) Foreign Application Priority Data

Nov. 9, 2017 (JP) .............................. JP2017-216607

(51) Int. Cl.
- *H02K 15/00* (2006.01)
- *B25J 9/00* (2006.01)
- *B25J 19/00* (2006.01)
- *B25J 9/10* (2006.01)
- *H02K 7/10* (2006.01)

(52) U.S. Cl.
CPC ........ *H02K 15/0006* (2013.01); *B25J 9/0009* (2013.01); *B25J 9/104* (2013.01); *B25J 19/0066* (2013.01); *H02K 7/1004* (2013.01)

(58) Field of Classification Search
CPC ... H02K 15/0006; H02K 7/1004; B25J 9/104; B25J 19/0066; B25J 9/0009
See application file for complete search history.

(56) References Cited

U.S. PATENT DOCUMENTS

| | | | | |
|---|---|---|---|---|
| 4,224,544 A | * | 9/1980 | McKinnon | H02K 5/15 310/49.43 |
| 4,362,065 A | * | 12/1982 | Baratti | F02N 15/06 15/6 |
| RE31,525 E | * | 2/1984 | Boyd, Jr. | F16M 1/04 248/581 |
| 5,327,795 A | | 7/1994 | Katahira | |

(Continued)

FOREIGN PATENT DOCUMENTS

| CN | 204954741 U | 1/2016 |
|---|---|---|
| DE | 200 15 368 U1 | 12/2000 |

(Continued)

OTHER PUBLICATIONS

Japanese Decision to Grant a Patent dated Aug. 20, 2019, in connection with corresponding JP Application No. 2017-216607 (5 pgs., including English translation).

(Continued)

*Primary Examiner* — Moshe Wilensky
*Assistant Examiner* — Darrell C Ford
(74) *Attorney, Agent, or Firm* — Maier & Maier, PLLC

(57) ABSTRACT

An adapter for motor replacement includes fixing portions. The adapter has a shape of being placeable so as to be bridged between a housing that fixes a motor and a pulley that is fixed to the motor and transmits a rotary drive force via a belt and to avoid a space for removing the motor from the housing. The fixing portions are respectively fixed to the housing, to which the motor is fixed, and the pulley fixed to the motor.

3 Claims, 10 Drawing Sheets

(56) References Cited

U.S. PATENT DOCUMENTS

| | | | | |
|---|---|---|---|---|
| 5,467,840 A * | 11/1995 | Becher | ............... | A47C 1/126 |
| | | | | 180/220 |
| 8,291,789 B2 * | 10/2012 | Long | ............... | B25J 9/102 |
| | | | | 74/490.01 |
| 8,464,413 B1 | 6/2013 | Prater et al. | | |
| 2002/0026701 A1 | 3/2002 | Klann | | |
| 2008/0016979 A1 | 1/2008 | Yasumura et al. | | |
| 2008/0216596 A1 * | 9/2008 | Madhani | ............... | B25J 9/104 |
| | | | | 74/490.05 |
| 2009/0003953 A1 * | 1/2009 | Kvalheim | ............... | B23Q 3/155 |
| | | | | 409/192 |
| 2012/0292469 A1 * | 11/2012 | Miekley | ............... | G01D 11/30 |
| | | | | 248/221.11 |
| 2020/0180147 A1 * | 6/2020 | Huang | ............... | B25J 13/006 |
| 2020/0276720 A1 * | 9/2020 | Cui | ............... | B25J 17/0258 |
| 2020/0368897 A1 * | 11/2020 | Sa | ............... | B25J 11/003 |

FOREIGN PATENT DOCUMENTS

| | | |
|---|---|---|
| DE | 10 2011 010 020 A1 | 9/2011 |
| EP | 1 880 809 A1 | 1/2008 |
| FR | 2 813 545 A1 | 3/2002 |
| JP | H04-322992 A | 11/1992 |
| JP | H05-180299 A | 7/1993 |
| JP | H06-079681 A | 3/1994 |
| JP | H09-38885 A | 2/1997 |
| JP | 2004-291116 A | 10/2004 |
| JP | 2008-023642 A | 2/2008 |
| JP | 2013-049128 A | 3/2013 |
| JP | 2014-079863 A | 5/2014 |
| JP | 3196221 U | 2/2015 |

OTHER PUBLICATIONS

Japanese Search Report dated Aug. 13, 2019, in connection with corresponding JP Application No. 2017-216607 (27 pgs., including English translation).

Chinese Office Action dated Jan. 21, 2020, in connection with corresponding CN Application No. 201811312240.X (11 pgs., including machine-generated English translation).

* cited by examiner

ADAPTER FOR MOTOR REPLACEMENT AND MOTOR REPLACEMENT METHOD

CROSS-REFERENCE TO RELATED APPLICATIONS

This application claims the benefit of Japanese Patent Application No. 2017-216607, the content of which is incorporated herein by reference.

FIELD

The present invention relates to an adapter for motor replacement and a motor replacement method.

BACKGROUND

As a drive mechanism for a joint shaft of a robot, a mechanism may be used to transmit a drive force of a motor to the joint shaft via a pulley and a belt. There is known a robot provided with a plurality of motor units including a motor and a belt as a plurality of joint shafts (e.g., Japanese Unexamined Patent Application, Publication No. 2014-79863).

SUMMARY

One aspect of the present invention is an adapter for motor replacement including fixing portions. The adapter has a shape of being placeable so as to be bridged between a housing that fixes a motor and a pulley that is fixed to the motor and transmits a rotary drive force via a belt and to avoid a space for removing the motor from the housing. The fixing portions are respectively fixed to the housing, to which the motor is fixed, and the pulley fixed to the motor.

Further, another aspect of the present invention provides a motor replacement method including: a fixing step of bridging an adapter for motor replacement between a housing that fixes a motor and a pulley that is fixed to the motor and transmits a rotary drive force via a belt to fix the adapter to each of the housing and the pulley; a pulley removing step of removing the fixation between the pulley and the motor; and a motor removing step of removing the motor from the housing.

DETAILED DESCRIPTION

A robot 1 in which a motor is replaced using a replacement adapter 10 for motor replacement (adapter for motor replacement) according to an embodiment of the present invention will be described below with reference to the drawings.

Figure 1:
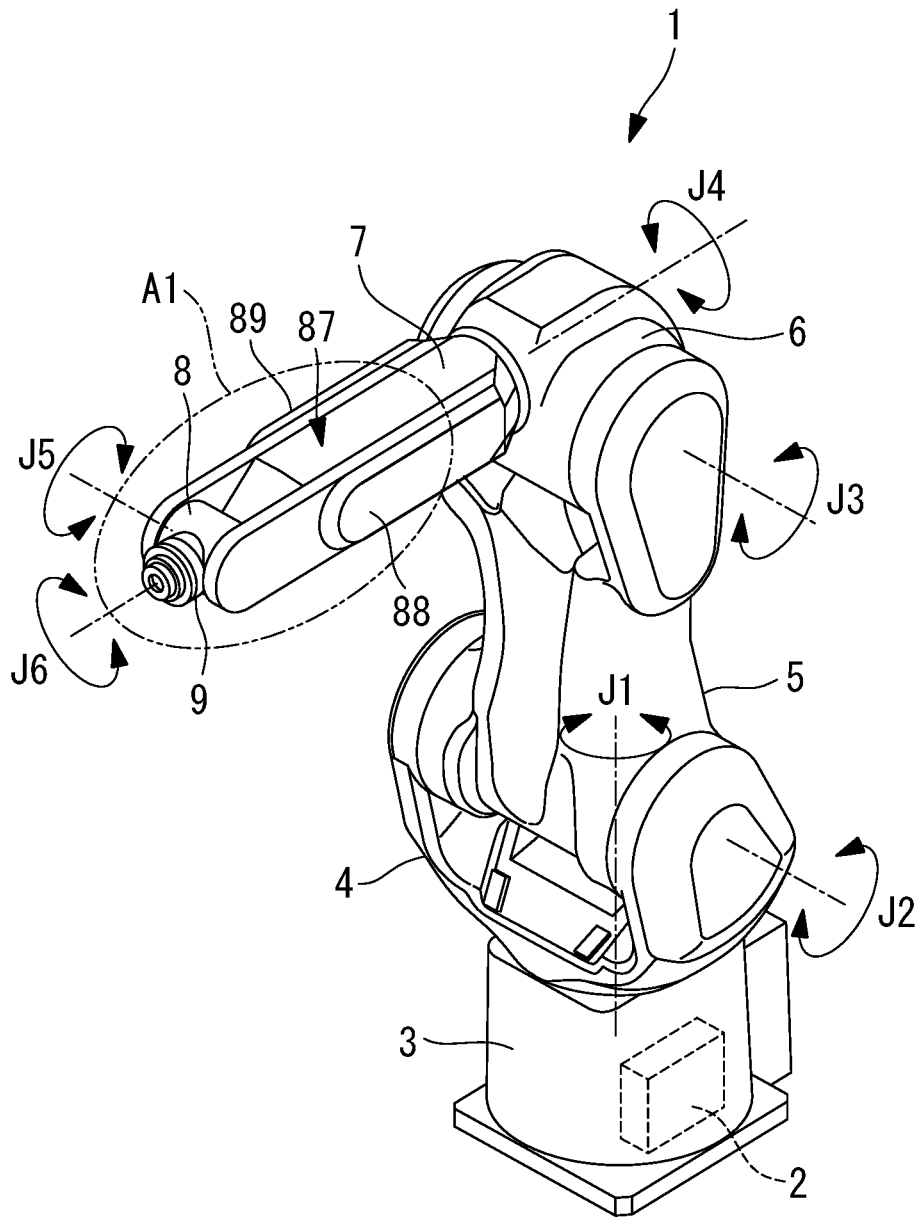
FIG. 1 is a schematic perspective view of a robot in which a motor is replaced using a replacement adapter according to the present embodiment.

FIG. 1 is a schematic perspective view of the robot 1 in which the motor is replaced using the replacement adapter 10 according to the present embodiment. The robot 1 of the present embodiment is a robot such as a vertical articulated type robot having six axes J1 to J6. The robot 1 includes: a base 3 fixed to the floor surface; a swinging body 4 rotatably supported around a vertical first axis J1 with respect to the base 3; a first arm 5 rotatably supported around a horizontal second axis J2 with respect to the swinging body 4; a second arm 6 rotatably supported around a horizontal third axis J3 with respect to the first arm 5; a first wrist element 7 rotatably supported around a fourth axis J4, which has a twisting positional relation with the third axis J3, with respect to the second arm 6; a second wrist element 8 rotatably supported around a fifth axis J5, which is orthogonal to the fourth axis J4, with respect to the first wrist element 7; a third wrist element 9 rotatably supported around a sixth axis J6, which is orthogonal to the fifth axis J5, with respect to the second wrist element 8; and a controller 2 that controls rotary drive of each of the six axes J1 to J6.

A motor (not shown) for performing rotary drive, and an encoder (not shown) that detects an angle of rotation of the motor are provided for each of the six axes J1 to J6. Using the rotation angle of the motor detected by the encoder for each of the axes J1 to J6, the controller 2 performs feedback control to cause the motor to perform the rotary drive. The controller 2 is made up of a CPU, a ROM, a RAM, and a memory (not shown).

The first wrist element 7 includes a housing body 87 in which a J5-axis motor for rotating the second wrist element 8 around the fifth axis J5 and the like are incorporated, and housing covers 88, 89 fixed to the housing body 87 to seal the space inside the housing body 87.

Figure 2:
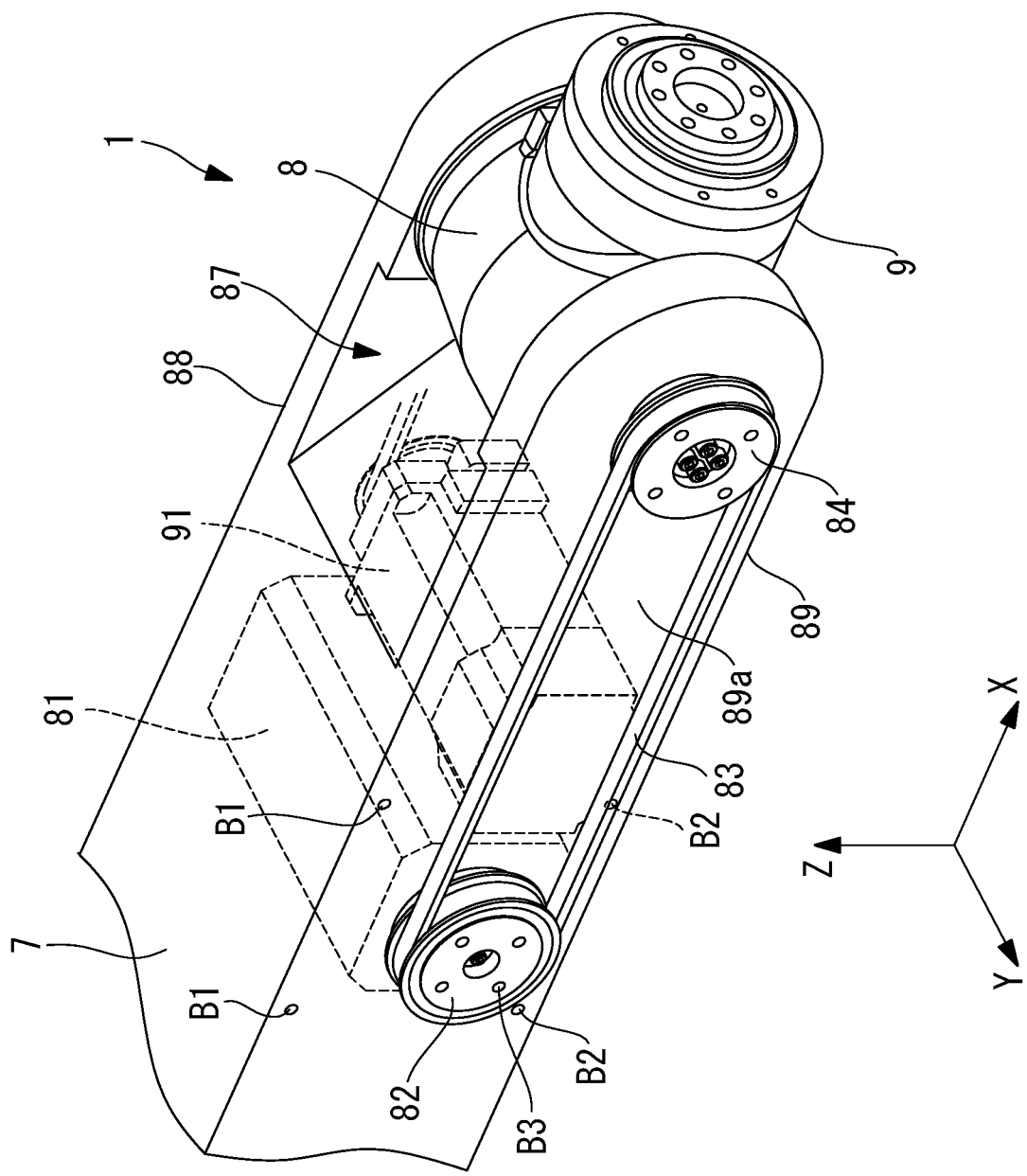
FIG. 2 is an explanatory view of parts incorporated in a second arm of the robot.

FIG. 2 shows an explanatory view for describing the parts incorporated in the first wrist element 7 of the robot 1. A housing body 87 has a hollow square columnar shape extending in the longitudinal direction of the first wrist element 7. In the present embodiment, a direction of a longitudinal axis of the first wrist element 7 is defined as an X-axis direction, a direction orthogonal to the planes of the tabular housing covers 88, 89 is defined as a Y-axis direction, and a Z-axis orthogonal to the X-axis and the Y-axis is defined. Note that a coordinate system of the defined XYZ-axes is shown in FIG. 2, and also in the subsequent drawings, the coordinate system of the XYZ-axes corresponds to the coordinate system of FIG. 2.

The housing body 87 houses a J5-axis motor (motor) 81 that rotates the second wrist element 8 around the fifth axis J5 and a J6-axis motor 91 that rotates the third wrist element 9 around the sixth axis J6. As shown in FIG. 2, a rotary shaft of the J5-axis motor 81 (hereinafter also referred simply as "motor shaft") extends in the Y-axis positive direction from the J5-axis motor 81, and a first pulley 82 is fixed to the tip of the rotary shaft in the Y-axis positive direction side. On the tip side of the first wrist element 7 on the X-axis positive direction side, the rotary shaft of the fifth axis J5 is disposed and a second pulley 84 connected to the rotary shaft via a reducer is disposed. A belt 83 is wound on the first pulley 82 and the second pulley 84 therebetween, and a rotary drive force of the J5-axis motor 81 is transmitted to the rotary shaft of the fifth axis J5 via the belt 83.

As shown in FIG. 2, when the housing cover 89 is fixed to the housing body 87, two first threaded holes B1 and two second threaded holes B2 for fastening bolts which are inserted from a Y-axis positive direction are formed on a side surface portion 89a in the housing body 87 facing the housing cover 89.

As shown in FIG. 2, the first threaded hole B1 is formed on a Z-axis positive direction side and the second threaded hole B2 is formed on a Z-axis negative direction side with respect to the first pulley 82 fixed to the rotary shaft of the J5-axis motor 81 fixed to the housing body 87. The two first threaded holes B1 are formed on the same axis parallel to the X-axis, and the two second threaded holes B2 are also formed on the same axis parallel to the X-axis. The first threaded hole B1 and the second threaded hole B2 located on the X-axis negative direction side are formed on the same axis parallel to the Z-axis, and the first threaded hole B1 and the second threaded hole B2 located on the X-axis positive direction side are formed on the same axis parallel to the Z-axis.

Four third threaded holes B3 for tightening bolts that are inserted from the Y-axis positive direction are formed in the first pulley 82 fixed to the rotary shaft of the J5-axis motor 81 fixed to the housing body 87. The four third threaded holes B3 are disposed on the same circumference having the center of the first pulley 82 as the center, at each 90 degrees along a circumferential direction.

Figure 3:
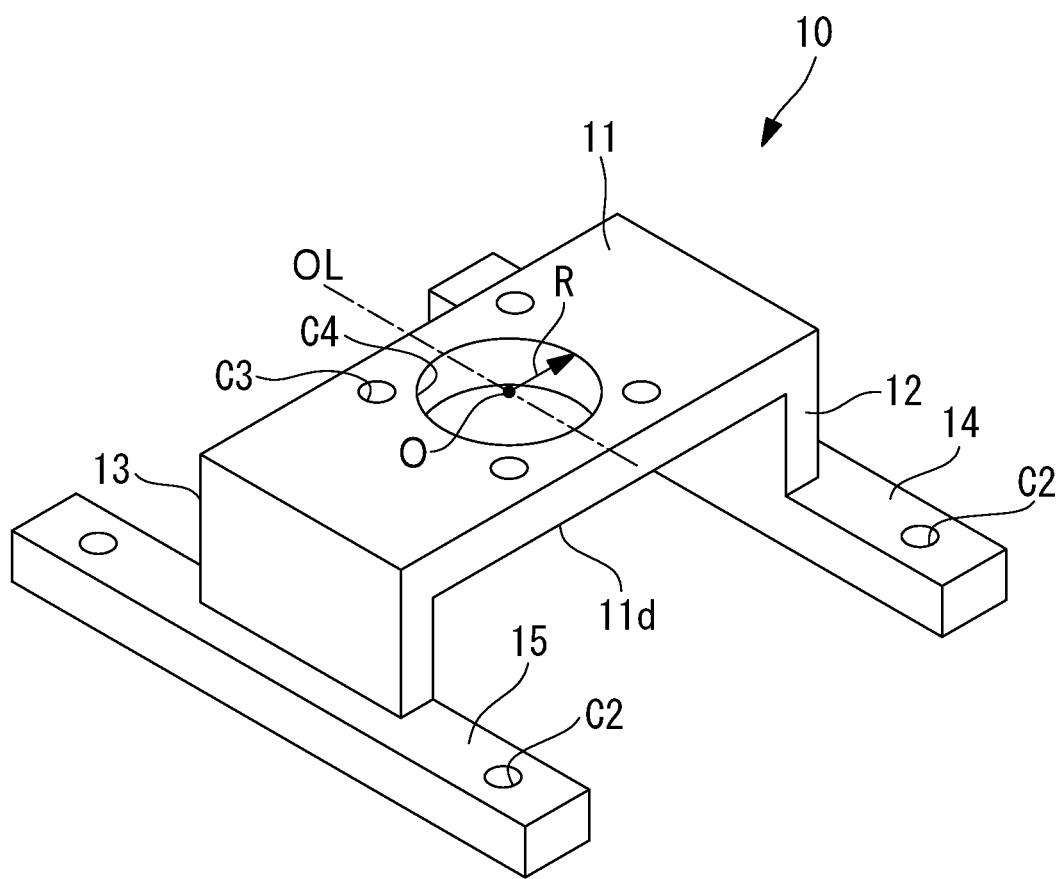
FIG. 3 is a perspective view of a replacement adapter for motor replacement according to one embodiment of the present invention.

FIG. 3 shows a perspective view of the adapter 10 for motor replacement (hereinafter referred to as replacement adapter) according to one embodiment of the present invention which is used in the case of replacement of the J5-axis motor 81. The replacement adapter 10 is fixed to the housing body 87 with the bolts by using the first threaded holes B1 and the second threaded holes B2 formed in the housing body 87. Further, in the replacement adapter 10, the first pulley 82 can be fixed thereto with the bolts by using the third threaded holes B3 formed in the first pulley 82. The replacement adapter 10 is, for example, a metal member processed by shaving.

The replacement adapter 10 is provided with a tabular pulley fixing plate (fixing portion) 11, two tabular leg portions (fixing portion) 14, 15 along a plane parallel to the pulley fixing plate 11, and coupling portions 12, 13 respectively coupling both ends of the pulley fixing plate 11 and the leg portions.

A circular opening C4 and four second through holes C3 are formed in the pulley fixing plate 11. The opening C4 has a predetermined radius R with a center O as the center and penetrates in a plate-thickness direction. The second through holes C3 penetrate in the plate-thickness direction radially outside the opening C4.

The opening C4 is open with the radius R to such a degree as to be able to avoid the end of the motor shaft, to which the first pulley 82 is fixed, and the bolt fixing the first pulley 82 to the motor shaft and to loosen the bolt by using a tool.

The four second through holes C3 are disposed on the same circumference having the center O as the center at each 90 degrees along a circumferential direction. The radius from the center O to the second through holes C3 is set so as to be the same as the radius from the center of the first pulley 82 to the third threaded hole B3 (FIG. 2). Thus, by fastening the bolt, inserted into the second through holes C3, into the third threaded hole B3 in the first pulley 82, the first pulley 82 can be fixed to the replacement adapter 10.

As shown in FIG. 3, each of the leg portions 14, 15 is formed with two first through holes C2 penetrating in the plate-thickness direction. The distance between the two first through holes C2 formed in each of the leg portions 14, 15 is set so as to be the same distance as the distance between the two second threaded holes B2 formed in the housing body 87. By fastening the bolts, inserted into the first through holes C2, into the first threaded hole B1 and the second threaded hole B2 in the housing body 87, the replacement adapter 10 can be fixed to the housing body 87.

The distance between a fastening surface of the pulley fixing plate 11 with the pulley and a fastening surface 11d of each of the leg portions 14, 15 with the housing body is set so as to be the same as the distance between the surface of the first pulley 82 on the Y-axis positive direction side, which is fixed to the rotary shaft of the J5-axis motor 81 fixed to the housing body 87, and the surface of the housing body 87 on the Y-axis positive direction side.

Figure 4:
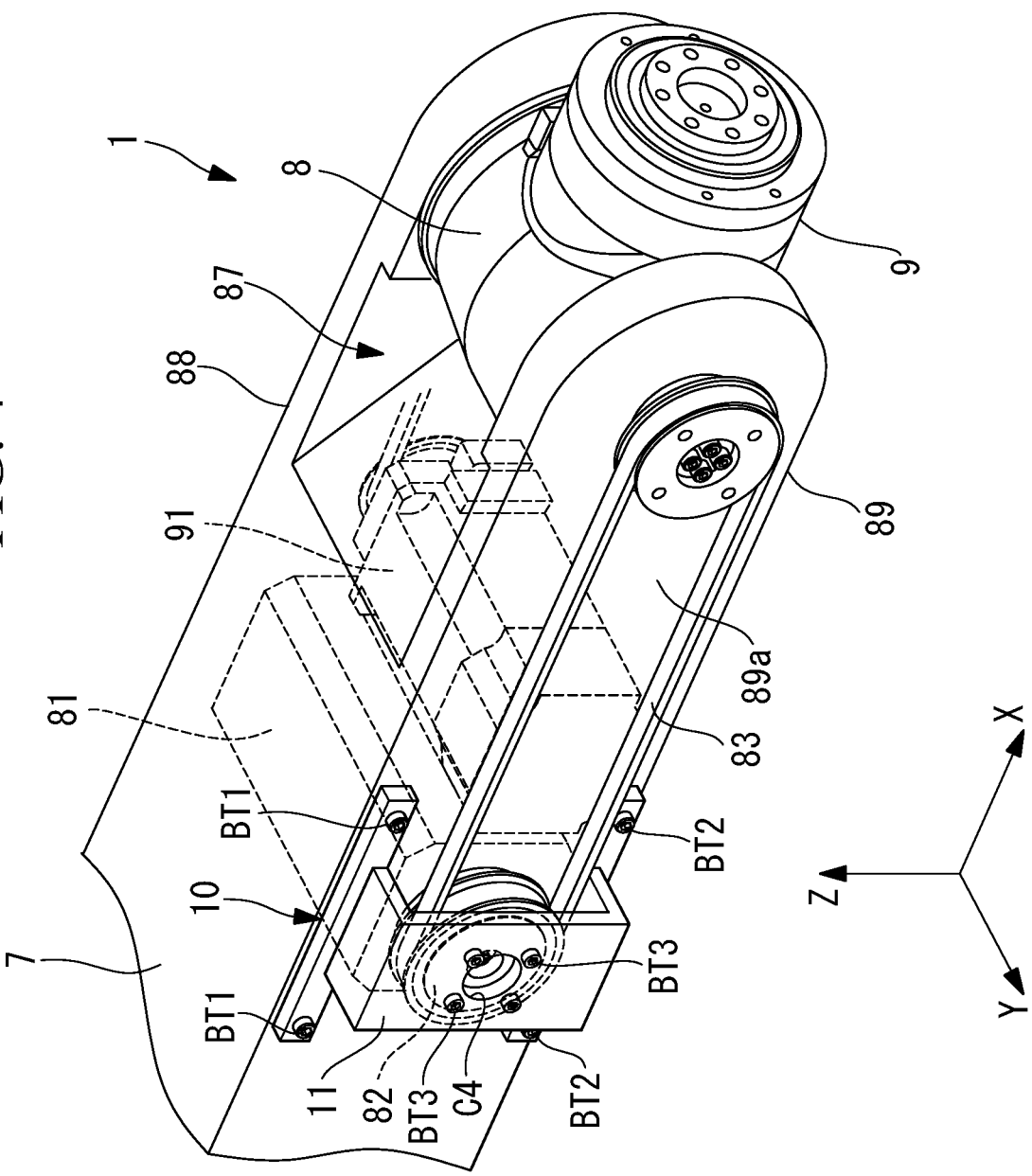
FIG. 4 is an explanatory view in a case where the replacement adapter has been fixed to a housing body.
Figure 5:
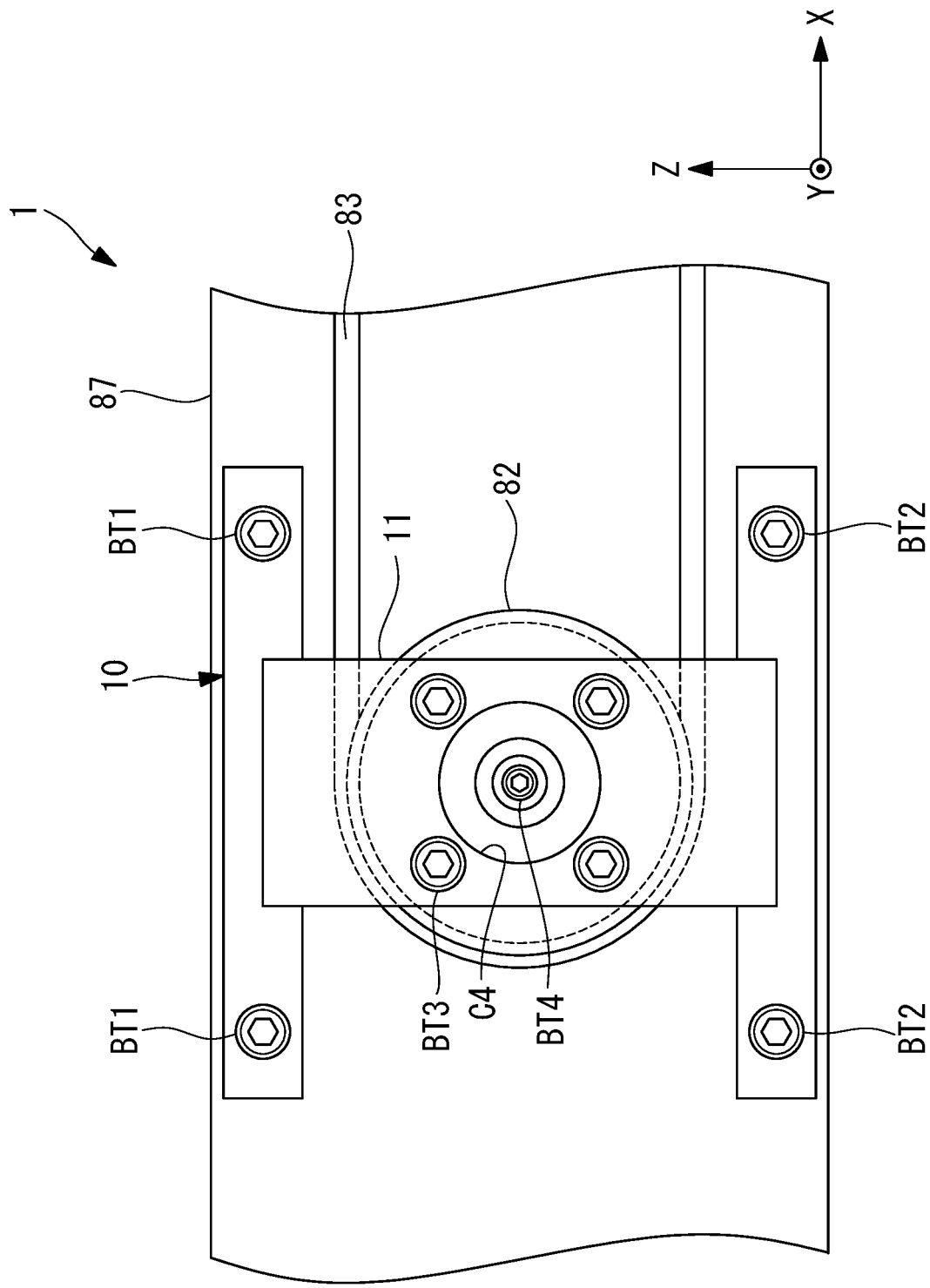
FIG. 5 is a partial front view in the case where the replacement adapter has been fixed to the housing body.
Figure 6:
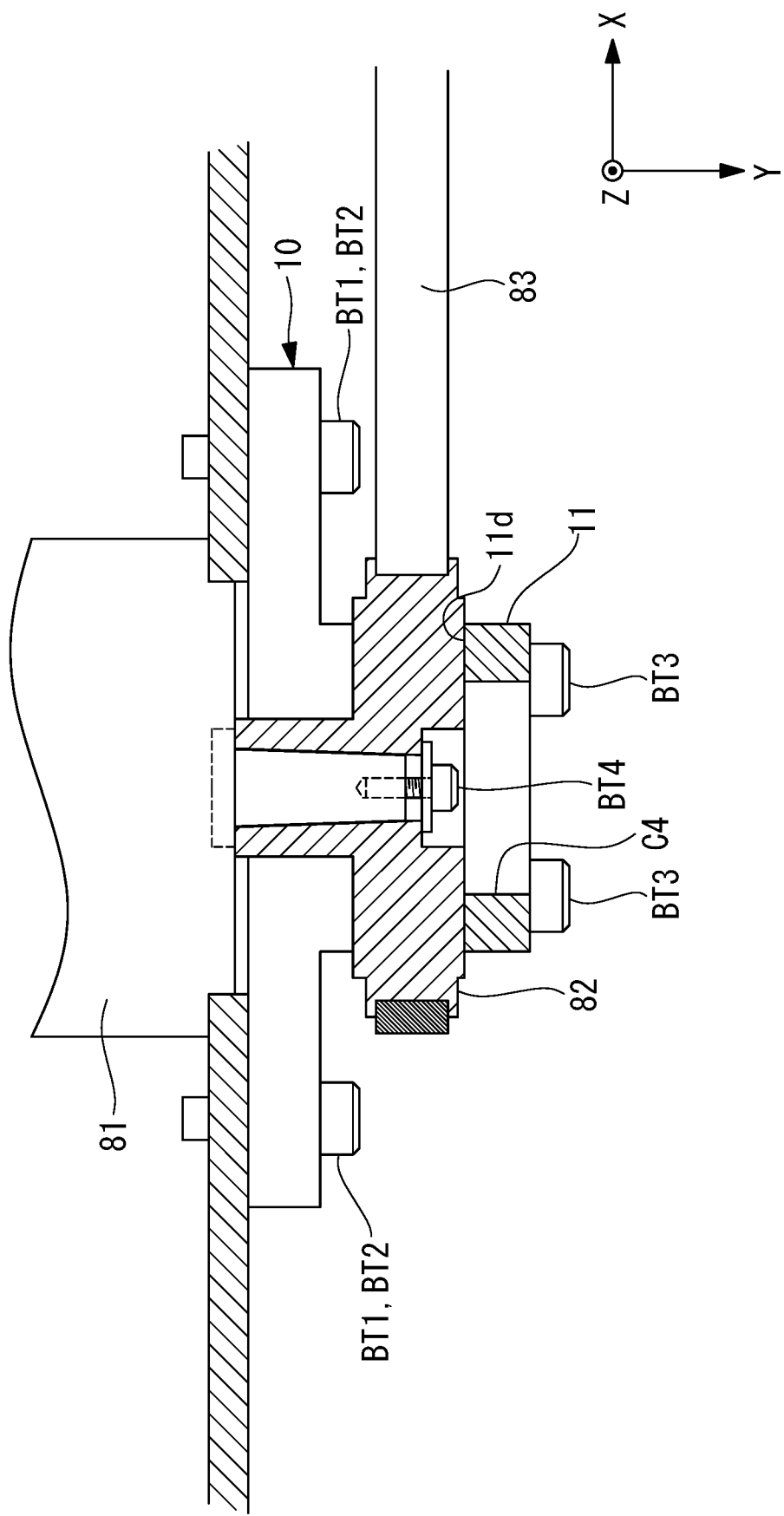
FIG. 6 is a partial sectional view in the case where the replacement adapter has been fixed to the housing body.

Each of FIGS. 4 to 6 shows an explanatory view of a case where the replacement adapter 10 is fixed to the housing body 87 from which the housing cover 89 has been removed. As shown in FIGS. 4 and 5, two bolts BT1 inserted into the first through holes C2 in the leg portion 14 are fastened into the first threaded holes B1, and two bolts BT2 inserted into the first through holes C2 in the leg portion 15 are fastened into the second threaded holes B2, to thereby fix the replacement adapter 10 to the housing body 87.

As shown in FIG. 6, when the replacement adapter 10 is fixed to the housing body 87, the fastening surface 11d of the pulley fixing plate 11 in the replacement adapter 10 comes into contact with the surface of the first pulley 82 on the Y-axis positive direction side. The first pulley 82 is rotated in this state, thereby enabling phase matching between the third threaded holes B3 formed in the first pulley 82 and the second through holes C3 formed in the pulley fixing plate 11 of the replacement adapter 10. In the state of the phases matching each other, four bolts BT3 are inserted into the second through holes C3 and fastened into the third threaded holes B3, to fix the first pulley 82 to the replacement adapter 10.

Figure 7:
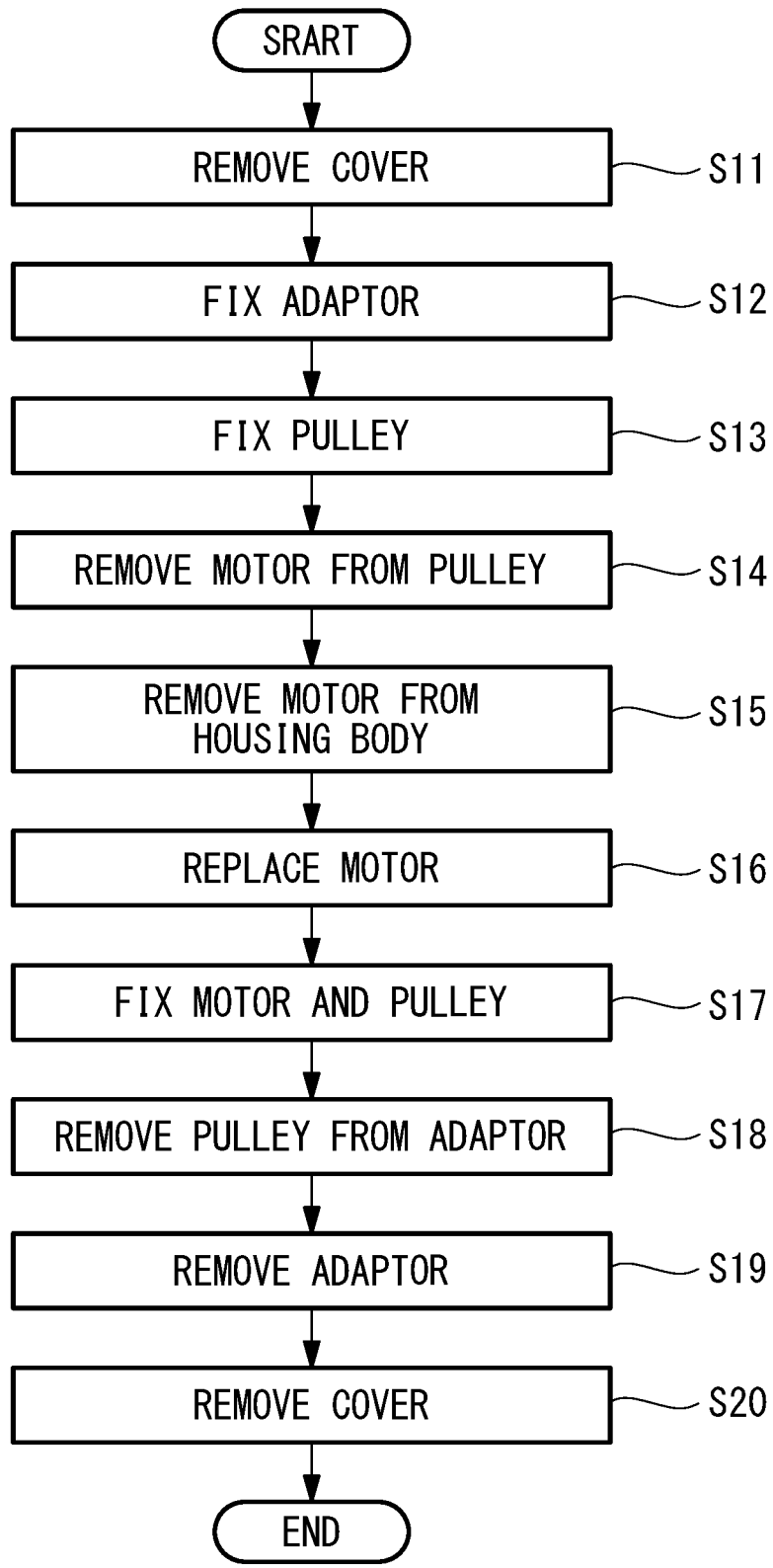
FIG. 7 is a flowchart of a replacement process in the case of replacing a J5-axis motor.

FIG. 7 shows a flowchart of a replacement process for the J5-axis motor 81 until the J5-axis motor 81 fixed to the housing body 87 is removed from the housing body 87. In the replacement process for the J5-axis motor 81, first, the housing covers 88, 89 attached to the housing body 87 are removed (Step S11). Subsequently, as shown in FIG. 4, the replacement adapter 10 covering the surface of the first pulley 82 on the Y-axis positive direction side with the pulley fixing plate 11 is disposed, and the replacement adapter 10 is fixed to the housing body 87 with the bolts BT1, BT2 (Step S12 of FIG. 7).

Next, the bolts BT3 are fastened into the third threaded holes B3 formed in the first pulley 82 to fix the first pulley 82 to the replacement adapter 10 fixed to the housing body 87 (Step S13). Note that the process in combination of the process of Step S12 and step S13 corresponds to the fixing step in the claim.

After the fixation of the first pulley 82 to the replacement adapter 10, a pulley removing step is performed in which a bolt (fastener) BT4 fastened into the threaded hole formed in the rotary shaft of the J5-axis motor 81 shown in FIG. 5 is removed using a tool, such as a hexagonal wrench, caused to access via the opening C4 formed in the replacement adapter 10, to remove the J5-axis motor 81 from the first pulley 82 (Step S14 of FIG. 7). Next, a motor removing step is performed in which the bolts fixing the J5-axis motor 81 to the housing body 87 and the like are removed to remove the motor from the housing body 87 (Step S15).

Thereafter, the removed J5-axis motor 81 is replaced with a new motor, and the new motor is fixed to the housing body 87 (Step S16). The rotary shaft of the fixed new J5-axis motor 81 and the first pulley 82 fixed to the replacement adapter 10 are fixed to each other with the bolt BT4 (Step S17). Next, the bolts BT3 fastened into the third threaded holes B3 of the first pulley 82 are released to remove the first pulley 82 from the replacement adapter 10 (Step S18).

Thereafter, the bolts BT1, BT2 fastened into the first threaded hole B1 and the second threaded hole B2 are released, to remove the replacement adapter 10 from the housing body 87 (Step S19). Next, the housing cover 89 is attached so as to seal the space for housing the first pulley 82 (Step S20), to complete the replacement process for the J5-axis motor 81.

The replacement adapter 10 for motor replacement according to the present embodiment as thus configured is fixed so as to be wound on the housing body 87 fixing the J5-axis motor 81 and on the first pulley 82 fixed to the rotary shaft of the J5-axis motor 81. Therefore, in a state where the position of the first pulley 82 is fixed with respect to the housing body 87, the J5-axis motor 81 can be removed from the first pulley 82 and replaced with a new J5-axis motor 81.

That is, although the belt 83 is wound on the first pulley 82 fixed by the replacement adapter 10 and on the second pulley 84 in the state of being applied with a tension, even when the J5-axis motor 81 is removed, the tension of the belt 83 is kept the same as the tension when the J5-axis motor 81 performs rotary drive. Hence the present embodiment has an advantage that the J5-axis motor 81 can be replaced without loosening the tension of the belt 83, thus improving the maintainability of the J5-axis motor 81 in the robot 1.

Further, the replacement adapter 10 for motor replacement of the present embodiment is provided with the pulley fixing plate 11 formed with the circular opening C4 having the predetermined radius R. When the replacement adapter 10 is fixed to the housing body 87 in a state where the J5-axis motor 81 is fixed to the housing body 87 and the first pulley 82 is fixed to the rotary shaft of the J5-axis motor 81, the opening C4 formed in the pulley fixing plate 11 is disposed at a position that faces the bolt BT4 fastening the rotary shaft of the J5-axis motor 81 and the first pulley 82. Thus, even when the first pulley 82 is fixed to the replacement adapter 10, the tool such as the hexagonal wrench for removing the bolt BT4 is caused to access the bolt BT4 via the opening C4 formed in the replacement adapter 10, thereby preventing the replacement adapter 10 from hindering removal of the first pulley 82 and the J5-axis motor 81 to improve the maintainability of the J5-axis motor 81.

Figure 8:
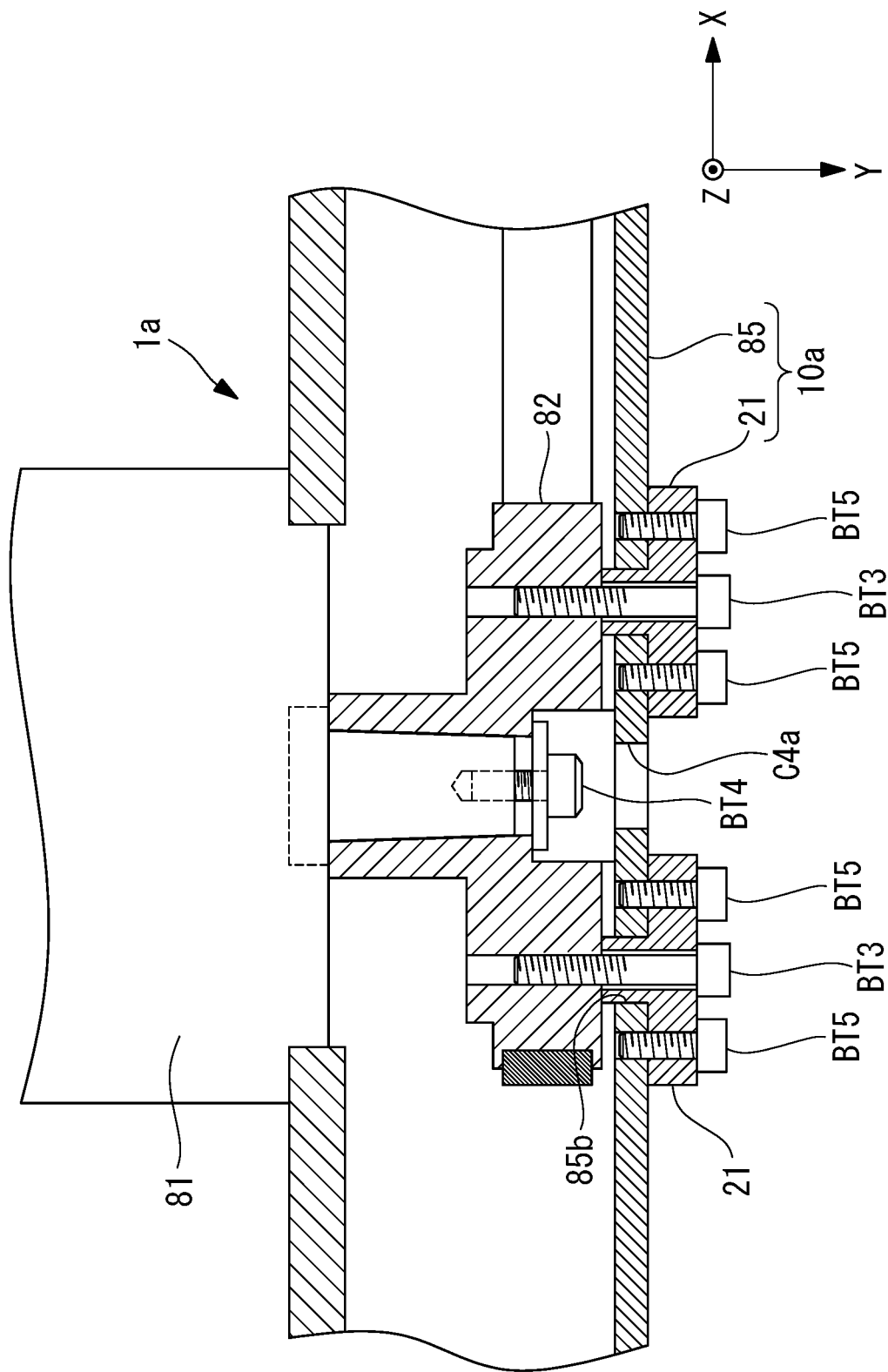
FIG. 8 is a partial sectional view of a robot to which a replacement adapter according to a second embodiment has been attached.

FIG. 8 shows a replacement adapter 10a according to a second embodiment including a housing cover 85 and a sleeve 21 for fixing the first pulley 82 in the case of replacing the J5-axis motor 81. In the second embodiment, the housing cover 85 which remains fixed to the housing body 87 and the sleeve 21 inserted into a third through hole 85b formed in the housing cover 85 function as the replacement adapter 10a. For this reason, in the second embodiment, a configuration different from that in the first embodiment will be described, and descriptions of the same configuration as in the first embodiment will be omitted.

As shown in FIG. 8, the housing cover 85 is fixed to the housing body 87 to seal a space in which the first pulley 82 is housed. The housing cover 85 is formed with an opening C4a through which the bolt BT4 that fixes the first pulley 82 to the rotary shaft of the J5-axis motor 81 is accessible, four third through holes 85b into which the sleeves 21 are inserted, and a plurality of fifth threaded holes B5 capable of fastening bolts. The four third through holes 85b are formed at positions with different phases for each 90 degrees around the opening C4a. As shown in the exploded perspective view of FIG. 9, the fifth threaded holes B5 are formed at positions with different phases for each 90 degrees around the third through hole 85b.

Figure 9:
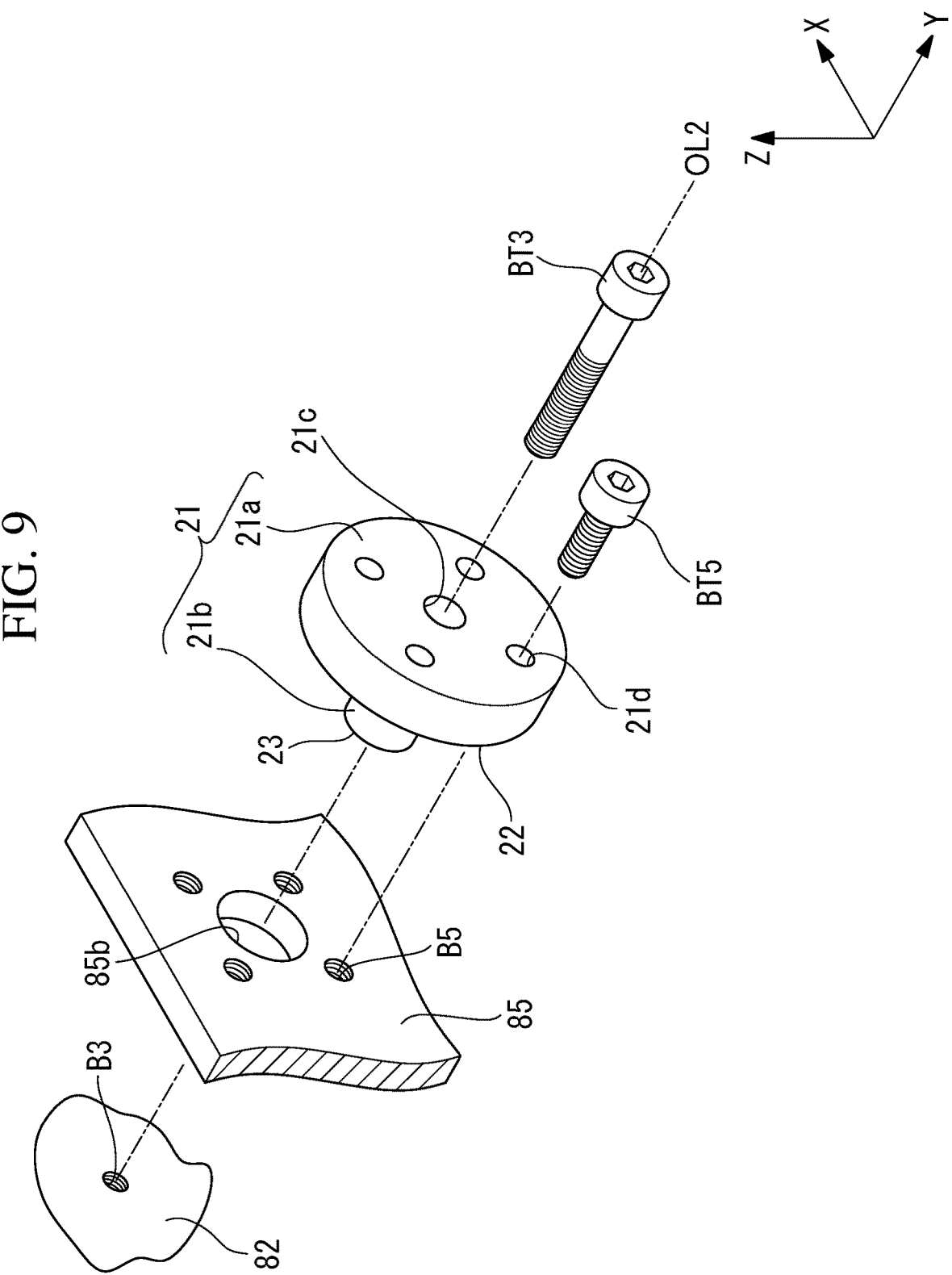
FIG. 9 is an exploded perspective view of the replacement adapter and members thereearound.

As shown in FIG. 9, the sleeve 21 is provided with a disc-shaped small diameter portion 21b having the same outer diameter as the diameter of the third through hole 85b, and a flange-shaped large diameter portion 21a coaxial to the small diameter portion 21b and having an outer diameter larger than that of the small diameter portion 21b. The sleeve 21 is formed with a fourth through hole 21c for insertion of the bolt BT3 penetrating the centers of the small diameter portion 21b and the large diameter portion 21a in the thickness direction, and four fifth through holes 21d which penetrate a flange-shaped portion in the large diameter portion 21a in the thickness direction. The fifth through holes 21d are formed at positions with different phases for each 90 degrees with a central axis OL2 of the sleeve at the center. A bolt BT5 which is fastened into the third through hole 85b of the housing cover 85 is inserted into each fifth through hole 21d.

As shown in FIG. 8, the length of the small diameter portion 21b in the sleeve 21 in the thickness direction is set to be such a length that a first abutting surface 23 in the small diameter portion 21b comes into contact with the side surface of the first pulley 82 when the sleeve 21 is inserted into the third through hole 85b and a second abutting surface 22 in the large diameter portion 21a comes into contact. That is, when the sleeve 21 is inserted into the third through hole 85b, the first abutting surface 23 comes into contact with the side surface of the first pulley 82 while the second abutting surface 22 comes into contact with the surface of the housing cover 85.

In the state shown in FIG. 8, after insertion of the sleeve 21 into the third through hole 85b of the housing cover 85, the sleeve 21 is fixed to the housing cover 85 by using the bolt BT5 inserted in a state where the phases of the fifth threaded hole B5 of the housing cover 85 and the fifth through hole 21d match. Further, the first pulley 82 is fixed to the sleeve 21 by using the bolt BT3 inserted into the fourth through hole 21c of the sleeve 21 inserted into the third through hole 85b.

After the fixation of the first pulley 82, the hexagonal wrench or the like is caused to access the bolt BT4 fastening the rotary shaft of the J5-axis motor 81 via the opening C4a of the housing cover 85, to remove the J5-axis motor 81 from the first pulley 82. Thereafter, the housing cover 88 fixed to the Y-axis negative direction side in the housing body 87 is removed, and the J5-axis motor 81 can thus be removed from the housing body 87.

The replacement adapter 10a according to the second embodiment as thus configured is provided with the housing cover 85 formed with the third through hole 85b, into which the sleeve 21 is inserted, and the sleeve 21 fixed to the housing cover 85 and fixes the first pulley 82. The first abutting surface 23 in the sleeve 21 inserted into the third through hole 85b comes into contact with the side surface of the first pulley 82, and the first pulley 82 is fixed using the bolt BT3 via the sleeve 21.

In this manner, even when the housing cover 85 sealing the space in which the first pulley 82 is housed is not removed as in the first embodiment, the J5-axis motor 81 can be replaced without loosening the tension of the belt 83 by fixing the sleeve 21 to the third through hole 85b, thus leading to improvement in maintainability of the J5-axis motor 81.

Figure 10:
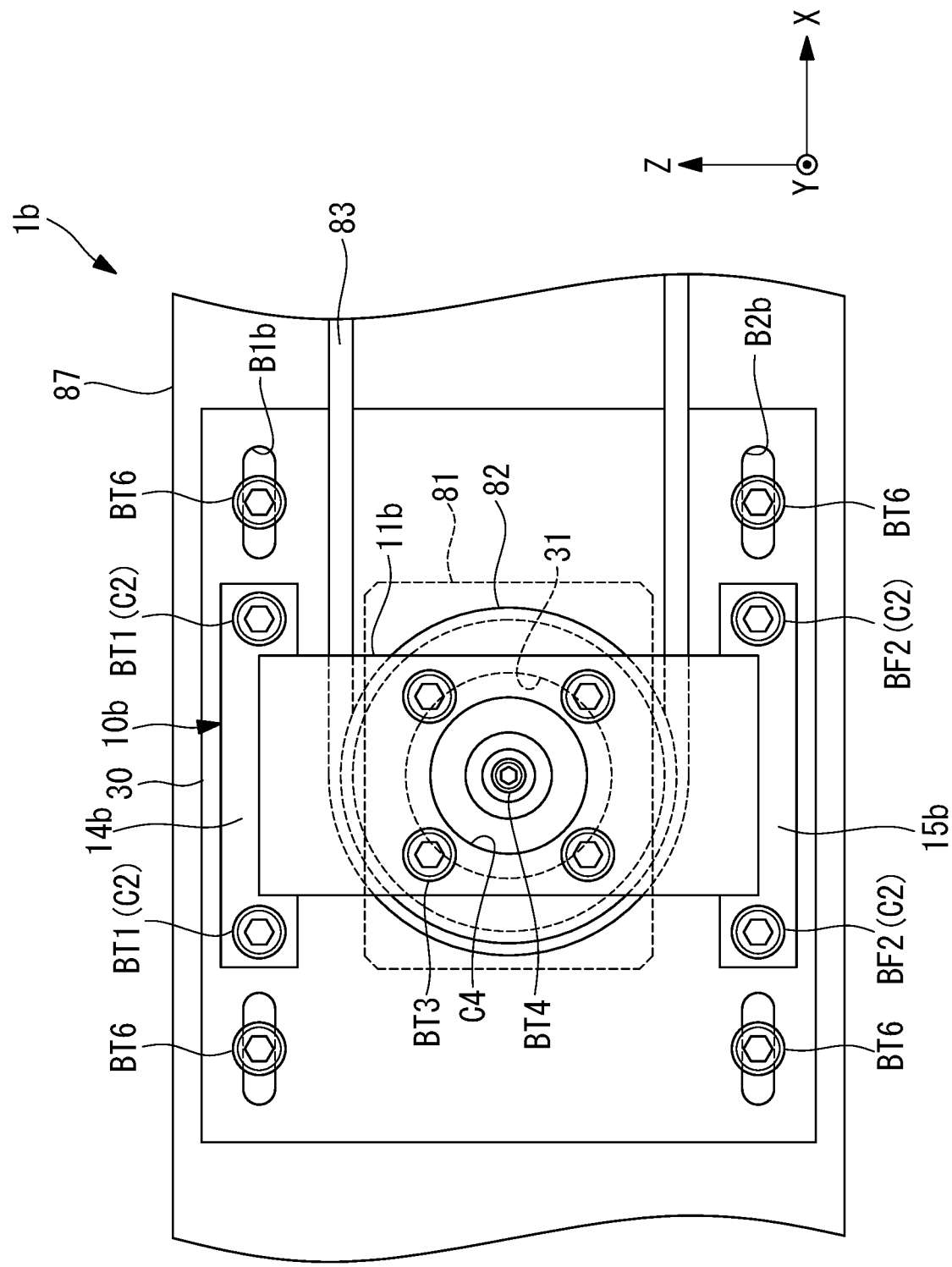
FIG. 10 is a partial front view of a robot to which a replacement adapter has been attached according to a modified example.

FIG. 10 shows a robot 1b as a modified example of the case where a motor adapter 30 capable of adjusting the tension of the belt 83 wound on the first pulley 82 is disposed between the housing body 87 and a replacement adapter 10b. The motor adapter 30 has a tabular shape, and as shown in FIG. 10, the motor adapter 30 includes: long holes B1b, B2b at four corners, with the X-axis direction taken as long axes; a second opening 31 formed in an adapter 10b and fitted with a spigot fit portion of the motor; a threaded hole (not shown) for fixing a J5-axis motor by bolt fastening; and a threaded hole (not shown) for fixing the replacement adapter 10b by bolt fastening. The J5-axis motor is attached to the motor adapter 30 through a through hole (not shown) provided in the housing body 87.

Bolts BT6 are inserted into each the respective four long holes B1b, B2b, and by fastening the bolts BT6 into the first threaded holes B1 (not shown in FIG. 10) formed in the housing body 87, the motor adapter 30 is fixed to the housing body 87. The bolts BT1, BT2, inserted into the first through holes C2 of the replacement adapter 10b, are fastened into the threaded holes (not shown) formed in the motor adapter 30, thereby fixing the replacement adapter 10b to the motor adapter 30.

By fastening of the bolt BT3 into a third bolt hole B3 (not shown in FIG. 10) formed on the side surface of the first pulley 82, the first pulley 82 is fixed to the replacement adapter 10b. In the replacement adapter 10b of the modified example, as compared to the replacement adapter 10 of the first embodiment, the lengths of coupling portions 12b, 13b along the Y-axis are short by the thickness of the motor adapter 30 along the Y-axis. Therefore, in the modified example, even when the motor adapter 30 is placed between the housing body 87 and the replacement adapter 10b, the fastening surface of a pulley fixing plate lib in the replacement adapter 10b comes into contact with the side surface of the first pulley 82.

In this modified example, the replacement adapter 10b that fixes the first pulley 82 is fixed to the housing body 87 via the motor adapter 30. The motor adapter 30 is fixed to the housing body 87 by using the bolts BT6 inserted into the long holes B1b, B2b. The motor adapter 30 can change its position with respect to the first threaded holes B1 where the bolts BT6 are fastened along the longitudinal axes of the long holes B1b, B2b. That is, the motor adapter 30 changes its position with respect to the housing body 87 along the X-axis to change the interval between the first pulley 82 and the second pulley 84, thus enabling adjustment of the tension that is applied to the belt.

In the modified example shown in FIG. 10, one form of placement of the motor adapter 30 between the housing body 87 and the replacement adapter 10b has been described, but a motor adapter 30a may be disposed between the housing body 87 and an attachment portion of the J5-axis motor 81. In this case, the motor adapter 30a is disposed on the opposite side to the replacement adapter 10b with respect to the housing body 87, the J5-axis motor 81 and the motor adapter 30a are fixed to each other, and the motor adapter 30a and the housing body 87 are fixed to each other. Therefore, when the fastening between the motor adapter 30a and the housing body 87 is released after the first pulley 82 is fixed to the housing body 87 by the replacement adapter 10b and the fixation between the first pulley 82 and the rotary shaft of the J5-axis motor 81 is released, the motor adapter 30a can also be replaced in the state of being unified with the J5-axis motor 81. Meanwhile, when the J5-axis motor 81 is removed from the motor adapter 30a fixed to the housing body 87 after the first pulley 82 and the rotary shaft of the J5-axis motor 81 are removed, only the J5-axis motor 81 can be replaced while the motor adapter 30a remains fixed to the housing body 87.

In the embodiment, the robot 1 including the J5-axis motor 81 housed in the housing body 87 has been described as one example, but various modifications can be made on the replacement adapter 10 of the first embodiment and the replacement adapter 10a of the second embodiment. For example, a replacement adapter 10, 10a may be used for replacement of a motor to be used in a robot other than the vertical articulated type robot. As the replacement adapter 10, 10a, the shape thereof is not limited to that in the first embodiment, but the replacement adapter 10, 10a may only be a member capable of fixing the housing body 87 without loosening the tension of the belt 83 wound on the first pulley 82. Similarly, as the housing cover 85 and the sleeve 21 of the second embodiment, the shapes and members thereof are not limited to those in the second embodiment but may only be shapes or members capable of fixing the housing body 87 without loosening the tension of the belt 83 wound on the first pulley 82.

In the replacement adapter 10 of the first embodiment, the third threaded holes B3 and the like for insertion of the bolts BT3 and the like have been formed as perfect circular through holes, but various modification can be made on the shape of the threaded hole into which the bolt is inserted. For example, in the replacement adapter 10 of the first embodiment, one of the first through holes C2 may be a long hole having a long axis extending along the X-axis as in the second embodiment, or a long hole having a long axis extending along the Z-axis.

From the above-described embodiment, the following invention is derived.

One aspect of the present invention is an adapter for motor replacement including fixing portions. The adapter has a shape of being placeable so as to be bridged between a housing that fixes a motor and a pulley that is fixed to the motor and transmits a rotary drive force via a belt and to avoid a space for removing the motor from the housing. The fixing portions are respectively fixed to the housing, to which the motor is fixed, and the pulley fixed to the motor.

According to the present aspect, when the adapter for motor replacement is disposed so as to be bridged between the housing to which the motor is attached and the pulley fixed to the motor, the adapter for motor replacement is disposed so as to avoid the space for removing the motor from the housing. In this state, while the adapter for motor replacement is fixed to each of the housing and the pulley with the fixing portions, the pulley is separated from the motor and the motor is removed from the housing, so that the pulley is kept at a position where the pulley has been attached to the motor. That is, at the time of replacing an aged motor in accordance with the usage conditions of the robot, there is no need to move the position of the pulley, thereby enabling replacement of the motor without loosening the tension of the belt wound on the pulley. This leads to improvement in maintainability of the motor in the robot.

In the above aspect, the fixing portions may include a first through hole allowing passage of a bolt that is fastened into a threaded hole provided in the housing, and a second hole that allows passage of a bolt that is fastened into a threaded hole provided in the pulley.

In such a manner, when the adapter for motor replacement is displaced so as to be bridged between the housing and the pulley, the adapter for motor replacement is displaced while the first through hole of the fixing portion of the adapter is aligned with the threaded hole of the housing and the second through hole is aligned with the threaded hole of the pulley, and the bolts allowed to pass through the first through hole and the second through hole are respectively fastened into the threaded holes to facilitate fixation of the pulley to the housing by using the adapter for motor replacement.

In the above aspect, the adapter for motor replacement may include an opening that enables to access a fastener fixing the pulley to the motor in a state where the adapter is bridged and fixed between the housing and the pulley.

By accessing the fastener via the opening, the pulley can be removed from the motor while the position of the pulley with respect to the housing is fixed by the adapter for motor replacement.

In the above aspect, the adapter for motor replacement may include: a housing cover having a shape of being placeable so as to be fixed to the housing such that a space for housing the pulley is sealed and to avoid a space for removing the motor from the housing; and a sleeve that is inserted into a third through hole provided in the housing cover and includes a first abutting surface that abuts on a surface of the pulley and a second abutting surface that abuts on a surface of the housing cover, and the sleeve may include a fourth through hole that opens on the first abutting surface and allows passage of a bolt which is fastened into a threaded hole provided in the pulley, and a fifth through hole that opens on the second abutting surface and allows passage of a bolt which is fastened into a threaded hole provided in the housing cover.

In this manner, when the sleeve is inserted into the third through hole formed in the housing cover, the first abutting surface of the sleeve abuts on the surface of the pulley and the second abutting surface of the sleeve abuts on the surface of the housing cover. In this state, the position of the sleeve with respect to the housing cover is fixed by the bolt inserted into the fifth through hole, and the position of the pulley with respect to the sleeve is fixed by the bolt inserted into the fourth through hole. Since the position of the pulley is thereby fixed with respect to the housing fixing the housing cover, even when the motor fixed to the pulley is removed, the tension of the belt wound on the pulley remains unchanged. This enables replacement of the motor without loosening the tension of the belt wound on the pulley before and after the motor replacement, thus further improving the maintainability of the motor in the robot.

Further, another aspect of the present invention provides a motor replacement method including: a fixing step of bridging an adapter for motor replacement between a housing that fixes a motor and a pulley that is fixed to the motor and transmits a rotary drive force via a belt to fix the adapter to each of the housing and the pulley; a pulley removing step of removing the fixation between the pulley and the motor; and a motor removing step of removing the motor from the housing.

According to the present aspect, when the adapter for motor replacement is fixed to the housing and the pulley in the fixing step, the position of the pulley attached to the motor is fixed. With the position of the pulley in the fixed state, by removal of the motor from the pulley and removal of the motor from the housing, the pulley is kept at the position where the pulley has been attached to the motor. That is, at the time of replacing an aged motor in accordance with usage conditions of the robot, there is no need to move the position of the pulley, thereby enabling replacement of the motor without loosening the tension of the belt wound on the pulley, to improve the maintainability of the motor in the robot.

REFERENCE SIGNS LIST

10, 10a, 10b replacement adapter (adapter for motor replacement)
11 pulley fixing plate (fixing portion)
14, 15 leg portion (fixing portion)
21 sleeve
21c fourth through hole
21d fifth through hole
22 second abutting surface
23 first abutting surface
81 J5-axis motor (motor)
82 first pulley (pulley)
83 belt
85 housing cover
85b third through hole
87 housing body (housing)
C2 first through hole
C3 second through hole
C4, C4a opening
BT4 bolt (fastener)
S12, S13 fixing step
S14 pulley removing step
S15 motor removing step

The invention claimed is:

1. An adapter for motor replacement, the adapter being used for a drive mechanism including a motor, a housing that fixes the motor, and a pulley that is fixed to the motor with a threaded fastener and transmits a rotary drive force via a belt, and the adapter comprising:
   a pulley fixing portion; and
   a housing fixing portion offset from the pulley fixing portion and coupled to the pulley fixing portion,
   wherein the adapter is configured to be placed so as to be bridged between the housing and the pulley and to avoid a space for removing the motor from the housing,
   the housing fixing portion is fixed to the housing,
   the pulley fixing portion is fixed to the pulley, and the pulley fixing portion includes an opening disposed such that, in a state where the pulley fixing portion is fixed to the pulley, and the housing fixing portion is fixed to the housing, the opening is superimposed over the threaded fastener and the threaded fastener is withdrawable through the opening;
   the adapter further comprising a housing cover as the pulley fixing portion and a sleeve as the housing fixing portion, the housing cover comprising the opening and the sleeve comprising a first abutting surface and a second abutting surface, wherein
   the housing cover is configured to be placed so as to be fixed to the housing so as to avoid a space for removing the motor from the housing,
   the first abutting surface is inserted into a third through hole provided in the housing cover to abut on a surface of the pulley, and the second abutting surface abuts on a surface of the housing cover, so that the sleeve is fixed to the housing cover and the pulley, and in a state where the housing cover is fixed to the housing, and the sleeve is fixed to the housing cover and the pulley, the opening is superimposed over the threaded fastener and the threaded fastener is withdrawable through the opening.

2. The adapter for motor replacement according to claim 1, wherein the housing fixing portion includes a first through hole through which a bolt that is fastened into a threaded hole provided in the housing is penetrated, and the pulley fixing portion includes a second through hole through which a bolt that is fastened into a threaded hole provided in the pulley is penetrated.

3. The adapter for motor replacement according to claim 1, wherein the sleeve includes:

a fourth through hole that opens on the first abutting surface and through which a bolt which is fastened into a threaded hole provided in the pulley is penetrated; and a fifth through hole that opens on the second abutting surface and through which a bolt which is fastened into a threaded hole provided in the housing cover is penetrated.

\* \* \* \* \*